US006918609B1

(12) United States Patent
Friery et al.

(10) Patent No.: US 6,918,609 B1
(45) Date of Patent: Jul. 19, 2005

(54) AIRBAG PRODUCTS WITH NONLINEAR TEAR SEAMS

(75) Inventors: Edward Friery, Coalville, UT (US); Brett Garner, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 266 days.

(21) Appl. No.: 09/677,058

(22) Filed: Sep. 29, 2000

(51) Int. Cl.$^7$ ............................................... B60R 21/16
(52) U.S. Cl. .................................. 280/728.1; 280/732
(58) Field of Search .......................... 250/728.1, 730.2, 250/731; 280/732, 728.3

(56) References Cited

U.S. PATENT DOCUMENTS

| | | | |
|---|---|---|---|
| 5,180,187 A | | 1/1993 | Muller |
| 5,335,935 A | * | 8/1994 | Proos et al. ............. 280/728.1 |
| 5,484,273 A | | 1/1996 | Parker |
| 5,499,842 A | * | 3/1996 | Yamamoto et al. ...... 280/728.3 |
| 5,527,574 A | | 6/1996 | Iannazzi |
| 5,533,749 A | | 7/1996 | Leonard |
| 5,669,632 A | | 9/1997 | Johnson |
| 5,685,560 A | * | 11/1997 | Sugiyama et al. .......... 280/731 |
| 5,692,769 A | | 12/1997 | Scharboneau |
| 5,863,064 A | * | 1/1999 | Rheinlander et al. ....... 280/732 |
| 5,957,484 A | | 9/1999 | Levine |
| 6,017,058 A | | 1/2000 | Ross |
| 6,076,851 A | * | 6/2000 | Davis et al. ............. 280/728.2 |
| 6,106,003 A | * | 8/2000 | Rahmstorf et al. ....... 280/728.3 |
| 6,129,378 A | * | 10/2000 | Goto et al. ................. 280/732 |
| 6,199,897 B1 | * | 3/2001 | Kreile ..................... 280/728.3 |
| 6,211,476 B1 | * | 4/2001 | Edie ......................... 200/61.08 |
| 6,453,535 B1 | * | 9/2002 | Nicholas ....................... 29/413 |

* cited by examiner

Primary Examiner—Lesley D. Morris
Assistant Examiner—L. Lum
(74) Attorney, Agent, or Firm—Sally J. Brown

(57) ABSTRACT

A novel cover for a safety restraint device is disclosed. The cover is well-adapted for use in vehicles with modular airbag components. The novel cover configuration of the present invention effectively hides any evidence of the seam through which the airbag deploys, thereby improving the appearance and tamper-resistance of the airbag. The cover includes a seam with a nonlinear portion that impedes folding or bending of the outer layer in conformance with the seam. The nonlinear portion of the seam may include bends and linear segments in a variety of shapes and sizes, in homogeneous or heterogeneous arrangements, as dictated by the design parameters of the airbag and the manufacturing processes used to make the cover. The cover module of the present invention may be used with an outer layer of material designed to conceal the seam. With such a configuration, the nonlinear portion of the seam may keep the outer layer from form fitting to the seam so that no visible indentation over the seam will be shown. Alternatively, the module may be made with a single-shot material, exclusive of any outer layer. An exposed surface of the airbag module may then be configured as a cosmetic surface, with the seam formed on the opposite side of the cosmetic surface. The nonlinear seam then reduces material deformation and obscures translucency to ensure that the cosmetic surface appears even and relatively flat, even without the use of a styling line.

27 Claims, 7 Drawing Sheets

AIRBAG PRODUCTS WITH NONLINEAR TEAR SEAMS

BACKGROUND OF THE INVENTION

1. The Field of the Invention

The present invention relates to safety restraint devices for vehicles. More specifically, the present invention relates to hidden seams designed to permit airbag deployment without any evidence of the seam visible to a user.

2. The Relevant Technology

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield.

During normal operation, the airbags are stowed behind covers to protect them from tampering and provide a more attractive interior facade for the vehicle. Seams, or deliberately weakened portions of the cover material, are included in the covers to ensure that the airbags deploy properly. Seams are necessary because, if the entire cover is made uniformly strong, random factors, such as manufacturing defects, in the cover will determine where the airbag emerges. It is necessary to ensure that deployment occurs at the proper location and time. Otherwise, a driver or passenger may not receive protection from the airbags, or may even be injured by improperly inflating airbags.

A seam may be a gap in the cover, held shut by threads, adhesives, etc. In the alternative, a seam may be constitute a line across the cover in which the material of the cover is formed thinner. In any case, the seam creates an inwardly-sloping region on the airbag cover. The seam may be on the inside of the cover, facing the airbag, or on the outside. Some covers include an outer layer of attractive material, such as leather, vinyl, or another plastic, that matches the remainder of the vehicle's interior. This layer also serves to cover the seam and hide it from view.

Other covers are made through "single-shot" construction, i.e., a manufacturing process in which only one single material is used. No cover layer is then used; rather, the surface facing the vehicle interior is made into a cosmetic surface through shaping and texturing. Styling lines are then typically molded into the cosmetic surface to obscure the underlying seam.

However, prior art seams typically have at least one long, straight section. Because of manufacturing methods currently used to attach the outer layer, the outer layer, if used, typically form-fits to the seam, creating an indentation in the outer layer over the seam. If no outer layer is used, a similar problem results because the styling line does not effectively fool anyone, and the styling line itself may be unsightly. If the styling line is omitted, a user may then "read through" the cosmetic surface and perceive the seam. Read through occurs because deformation of the material around the seam creates a visible indentation on the cosmetic surface. In many cases, the material of the seam is so thin that it is translucent to a user, who may then look through the cosmetic surface to perceive the seam or even the airbag inside the cover.

Consequently, nearly every vehicle with an airbag has a straight indentation or styling line in the interior finish. Since most airbags are placed at a location where they can protect a user from frontal impact, this indentation is nearly always directly in front of a person, in plain view. For this reason, the steering wheel and the passenger side dashboard of many vehicles prominently display a straight indentation or styling line covering the airbag.

The visible seam is problematic for a number of reasons. It may upset the design scheme of the interior material of the vehicle. Many modern vehicles utilize a smooth interior design that may be disrupted by the appearance of a seam in the middle of a panel. An automobile manufacturer may wish to employ curvilinear patterns on the interior finish of the vehicle. When combined with the straight indentations formed by prior art seams, however, such curvilinear patterns may appear incongruous and distracting.

Furthermore, a visible seam invites tampering by curious children and others. The seam is designed to yield to opening force, so it may be fairly easily broken to expose the airbag. If the airbag is tampered with, the owner may have to replace it, or may even be injured if it fails to deploy in the event of an accident. Even if no break is formed in the seam, the surface of the outer layer may be ruined by constant picking, poking, and scratching.

Moreover, another danger is present in vehicles in which interior airbag seams are visible. Some people form a habit of resting their hands in a certain fixed position on a surface, particularly over an irregularity such as a ridge, bump, or seam. For example, a driver may, while driving, subconsciously rub his or her fingers along the seam. Besides damage to the interior finish of the vehicle, this may ultimately cause injury to the driver when the airbag deploys. The rapid timing required to inflate an airbag before a person has struck a surface in the vehicle (such as the windshield) requires that the airbags open with explosive force. This will not typically injure a user situated normally in the vehicle, but body parts resting too close to the airbag, such as arms and hands, will be subject to the explosive force of the airbag's deployment. A user could then suffer serious injuries when the airbag deploys.

Even when known seams is not visible, they may be easily discovered by a user by simply pressing on the outer layer or cosmetic surface. In either case, if a linear seam is used behind the outer layer or cosmetic surface, the pressure causes the cover to fold inward along the seam, so that the seam is readily perceptible. Repeated application of pressure may even break the seam. Even if a seam is not otherwise visible, it is preferable, for many reasons, to ensure that it is entirely hidden from a user until the airbag deploys.

Accordingly, a need exists for a safety restraint device cover with a seam that will not be visible to a vehicle occupant, even when no styling line is used. The indentation produced by the seam is difficult to eradicate without the use of additional manufacturing processes to join disparate materials or alter the shape of the seam. Consequently, a need exists for a novel seam design that will not show through the outer layer, if a separate material is applied, or the cosmetic surface, if a single-shot, or single material process is used to form the cover. A need further exists for such a cover that is manufacturable through inexpensive processes such as stamping or molding.

BRIEF SUMMARY OF THE INVENTION

The apparatus of the present invention has been developed in response to the present state of the art, and in particular, in response to the problems and needs in the art that have not yet been fully solved by currently available airbag covers. Consequently, the present invention provides an easily manufactured airbag cover with a seam that remains hidden from view.

In accordance with the invention as embodied and broadly described herein in the preferred embodiment, a cover, including a novel seam design, is provided. The cover comprises a module insertable into a corresponding opening in the vehicle. An outer layer may also be applied to the module to hide the module from view. A seam may be formed in an outward-facing surface of the module to permit airbag deployment. The seam comprises a nonlinear portion, which includes a plurality of bends that discourage form-fitting of an outer layer over the seam. The bends may exist in a variety of configurations suitable for keeping the outer layer from folding into the seam. This permits the use of simple manufacturing processes, such as stamping and molding, to create the seam, without leaving an unsightly and potentially dangerous crease in the outer layer.

In the alternative, instead of the outer layer, a cosmetic surface may be formed on a portion of the module facing the vehicle interior. The nonlinear seam may then be formed in an inward-facing surface of the module. Such a nonlinear seam minimizes read through because the material does not deform uniformly to produce a translucent line. Even if the nonlinear seam does create translucent regions in the cosmetic surface, the translucent regions will be nonlinear, such that there is no viewpoint from which a user may see through any significant portion of the cover. There is no linear, regular feature to draw a viewer's attention.

Additionally, whether an outer layer or cosmetic surface is used, if a user presses against the cover, the cover does not deflect in such a way that the seam is easily discovered. The seam extends along multiple axes so that bending does not occur only along one axis, as with a linear seam. Rather, bending occurs along multiple axes, as would be expected for a surface with no weakened portions. In effect, since the seam, which forms a weakened region, is irregular, it will not be perceived by a user.

The nonlinear portion may be embodied in several different ways. For example, the seam may have a few larger bends of substantially equal size, with few or no straight sections between them. A larger number of smaller bends may also be used to decrease the width of the nonlinear portion, while retaining the novel benefits of the bends. In the alternative, the bends may have a very tight radius and simply connect linear segments in a zig-zag pattern. Linear segments may also be connected by bends arranged in pairs, to create a seam with a crankshaft-like appearance. Large-radius bends could even be used in combination with linear segments, perhaps by arranging the bends between symmetrical linear segments.

The bends and linear segments, if used, need not be uniform in arrangement or configuration. Any combination of the embodiments described above may be used according to the invention. Any seam in which no linear portion of any linear segment of any substantial length can be found is contemplated by the invention. Substantially linear or non-linear side portions of the seam may also be provided to enlarge the size of the opening through which the airbag will deploy. Additionally, the seam need not follow a generally linear course, but may be generally circular, semicircular, polygonal, or otherwise in its overall shape.

In operation, expanding gases fill the airbag, and the airbag bursts through the seam. Openings may form at one end of the seam and propagate rapidly from there to the other end, or all parts of the seam may burst open simultaneously. If an outer layer is used, it may break open in similar fashion.

In any case, despite the irregular shape of the seam, it will still open reliably as long as the seam is properly constructed, because the force tending to pull the seam apart will remain substantially the same as with a straight seam. The fact that the airbag deploys through a nonlinear opening will not substantially hinder its operation.

The seam of the present invention has application not only to driver and passenger side airbags, but also to other vehicle airbags. For example, side mounted airbags designed to protect occupants of a vehicle from lateral impact may utilize nonlinear tear seams to ensure that the lateral surfaces of the vehicle, such as doors, armrests, and side ceiling portions, do not show a seam or styling line where the airbag deploys. Similarly, airbags used to protect a vehicle occupant's legs may have a nonlinear tear seam hidden from view.

Thus, the current invention provides a novel, nonlinear seam for an airbag cover. If an outer layer is used, the nonlinear seam resists form-fitting of the outer layer over the seam by providing a number of bends into which the outer layer cannot easily fit. As a result, the outer layer maintains a much more attractive appearance and does not create a temptation for a person to tamper with the seam, or to maintain any body part in dangerously close proximity to the seam during operation of the vehicle.

Where a cosmetic surface is formed instead of the outer layer, the nonlinear seam prevents read through of the thinner material of the seam, and thus obviates any styling line used to hide the seam from view. The danger that a user will discover the seam and possibly even break open the cover by pressing on the outer layer or the cosmetic surface is further reduced. Hence, the seam of the present invention makes a vehicle safer, more attractive, and more wear-resistant than previously known seams.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
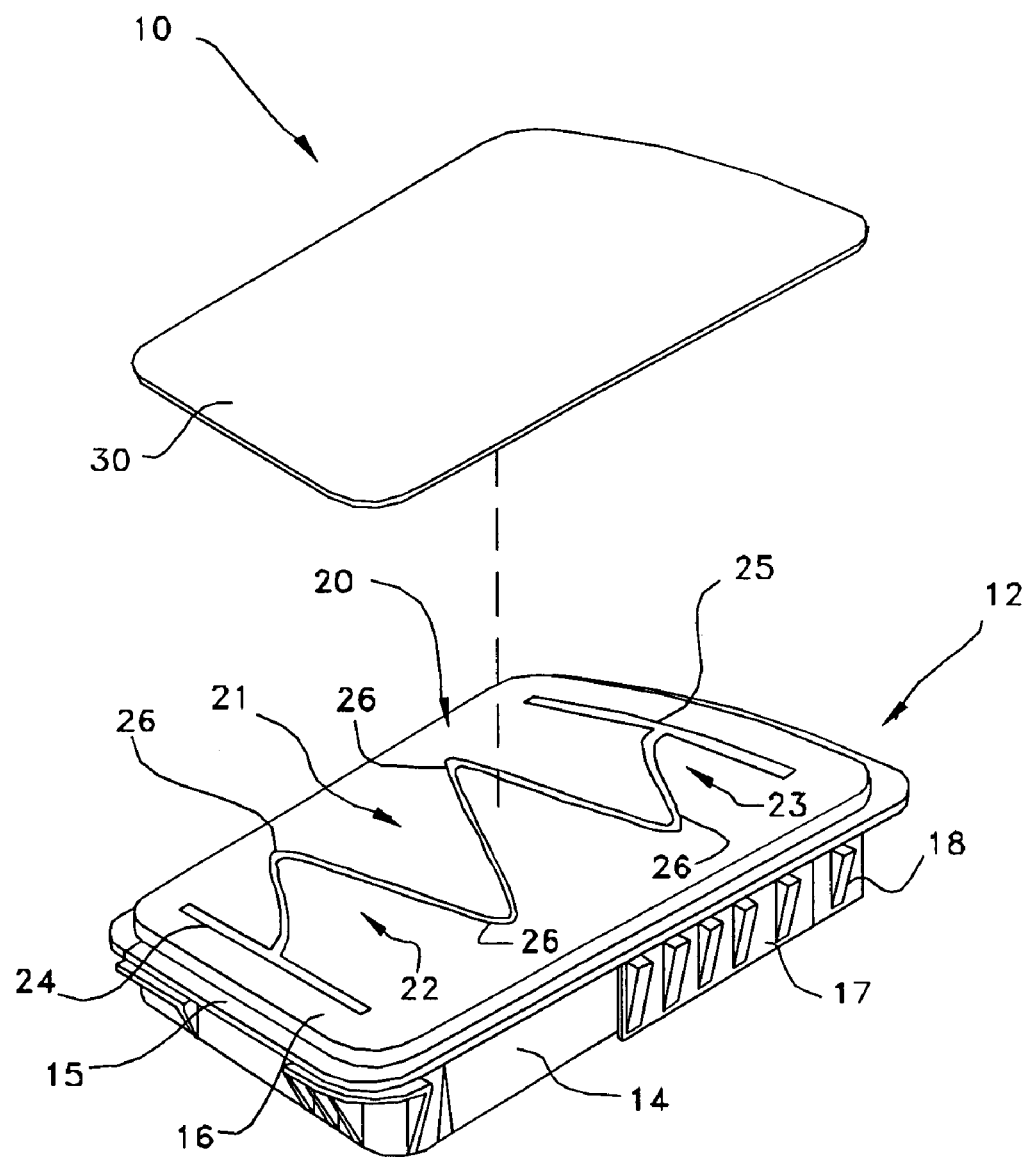
FIG. 1 is an exploded view of a safety restraint device cover, including a module with a seam having a nonlinear portion, according to the invention.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

As alluded to previously, airbags have become a great lifesaving tool for the automotive industry. For cosmetic and safety purposes, the airbags must be concealed underneath some type of solid, opaque cover after installation in a vehicle. Seams in the cover are necessary to ensure that the airbag inflates uniformly and through the correct part of the cover.

An outer layer may be applied to the cover to match the interior of the vehicle. However, known outer layers bend and fold to form-fit to the seam, thereby creating an unsightly, distracting, and even potentially dangerous indentation over the airbag. The outer layer may also be omitted in favor of single-shot construction, in which the cover is made from a single piece of material. With a single-shot cover, the seam is typically formed inside the cover. However, the seam may still be "read through" the cover, due to deflection the regions surrounding the seam and the translucent nature of many thinly-constructed plastics.

The present invention makes novel use of principles of material deformation to avoid the problems of the prior art. More specifically, a flat object bends far more readily than a bent or creased object. This is because bending is easiest along thin cross sections, and a bent or folded object has no thin cross section along which bending can easily occur. For example, houses with peaked roofs can bear far heavier loads than houses with flat roofs. Similarly, steel beams with an "I" shape are commonly used in construction because they withstand bending far more effectively than flat beams, without the expense and weight of a solid mass. In effect, an object that has already been bent or folded is somewhat thick along any cross section, and therefore is much more difficult to bend in a second direction.

The same principle applies to objects that have not yet been bent or folded. When an object is under multiple bending forces, each force limits the degree to which the other force can bend the object because bending in one direction increases the thickness of the object against bending in the other direction. As a result, the object may bend only slightly in all directions.

The current invention applies this principle to a seam for an airbag cover. Straight seams, like those of the prior art, will support the outer layer against bending in all directions except for one, so the outer layer will bend in the unsupported direction to fold into the seam. The present invention provides a meandering seam, so that the outer layer is supported against bending in all directions. Some bending may occur in all directions, but that bending is so minor as to be invisible to the naked eye. Additionally, small-scale, multi-directional bending precludes further bending in all directions. The operation of this principle is further illustrated in the following figures and their accompanying descriptions.

Referring to FIG. 1, one possible embodiment of a cover 10 according to the invention is shown. A module 12 is designed to be installed in an interior compartment (not shown) of a vehicle. The module 12 has a peripheral surface 14, shaped to properly fit against a mating surface in the vehicle, and a face portion 15 with an exterior side 16 facing the seat of a vehicle occupant. A skirt 17 is attached to the face portion 15 or the peripheral surface 14, and carries a series of locking tabs 18 designed to deform into locking engagement with corresponding structures in the interior compartment of the vehicle.

The module 12 may be integrally formed from any suitable material, including polymers, metals, ceramics, and composites. Alternatively, the various components of the module 12, including the peripheral surface 14, the face portion 15, the and the skirt 17, may be made from different materials assembled through means known in the art. The face portion 15 and skirt 17 are preferably made of an elastomeric, deformable material such as plastic. An airbag (not shown) may be attached to and installed with the module 12, or may be installed within the interior compartment before installation of the cover 10.

A seam 20 is formed in the face portion 15 to permit deployment of the airbag through the face portion 15. The seam 20 may take many forms, including an incision clear through the face portion 15 held shut by sewn fibers, adhesives, welds, deformable locking members, or other retention mechanisms known in the art. Alternatively, the seam 20 may be simply a region in which the face portion 15 is made thinner than in the surrounding regions, so that the seam 20 is the first portion to separate under stress. In such a configuration, the material of the face portion 15 may slope inward from the exterior side 16 to create a seam 20 in the form of a trough. The seam 20 is not limited to the forms disclosed herein, but includes any thin structure made to create an opening in a surface under stress.

The seam 20 includes a nonlinear portion 21, which is preferably centrally located on the face portion 15. For the purposes of this application, "nonlinear" refers to any narrow structure extending along a path from one end of the structure to the other, wherein the path is not a straight line. Conversely, "linear" refers to narrow structures extending along a straight line from one end of the structure to the other. Accordingly, a nonlinear object may include linear segments if the overall path followed by the nonlinear object is not a straight line. The nonlinear portion 21 satisfies this nonlinearity requirement because the path followed by the nonlinear portion 21 between first and second ends 22 and 23 of the nonlinear portion 21 is not a straight line.

The seam 20 preferably also includes a first side portion 24 attached to the first end 22 of the nonlinear portion 21, and a second side portion 25 attached to the second end 23 of the nonlinear portion 21. The first and second side portions 24 and 25 are oriented generally perpendicular to the general orientation of the nonlinear portion 21 (a straight path between the first and second ends 22 and 23). The side portions 24, 25 enlarge the size of the opening formed when the airbag deploys, to permit more rapid and reliable deployment.

The nonlinear portion 21 includes a number of bends 26 that create a meandering path between the first and second ends 22 and 23. According to this embodiment, the bends 26 are rounded. However, "bend" within this application is any feature in the nonlinear portion 21 that changes the path along the nonlinear portion 21 between the first and second ends 22, 23 in a clockwise or counterclockwise direction. Consequently, sharp turns as well as curves of any radius constitute "bends."

An outer layer 30 may be attached to the exterior side 16 of the face portion 15 by a means known in the art, including but not limited to chemical and adhesive bonding, heat welding, RF welding, interference fitting, deformable locking members, and heat shrinking. The outer layer 30 may be made from any suitable material, including polymers, metals, ceramics, and composites. However, it is desirable that the outer layer 30 be attractive, inexpensive, and weak enough to tear or detach from the exterior side 16 of the face portion 15 to permit deployment of the airbag. The outer layer 30 should also match the interior trim of the vehicle. Consequently, plastics or other materials used in the vehicle interior are preferred.

The ability of the outer layer 30 to form fit to the seam 20 is dependent upon the stiffness of the material forming the outer layer 30, the thickness of the outer layer 30, and the geometry of the seam 20. A thinner, more flexible outer layer 30 will more easily conform to the shape of the seam 20. In order to permit deployment of the airbag, the outer layer 30 must be substantially thin and flexible. Thus, the geometry of the seam 20 is the critical factor in determining whether the seam 20 shows through the outer layer 30.

Linear deformation, in the form of a straight crease or bend in the outer layer 30, readily occurs because deformation develops only along a thin cross-sectional area. When the outer layer 30 is deformed in one direction, an intersecting deformation is much more difficult to form because the first deformation effectively increases the thickness, and thereby the sectional modulus, of the outer layer 30 along the line of the first deformation. Consequently, existing deformations in the outer layer 30 make the outer layer 30 effectively stiffer and more resistant to further deformation.

The bends 26 in the nonlinear portion 21 are critical for that reason. By constantly changing the direction in which the outer layer 30 would have to deform to conform with the seam 21, the bends 26 do not enable the outer layer 30 to significantly deform in any direction. As a result, the outer layer 30 remains substantially flat, with a cavity between the seam 20 and the outer layer 30, and the seam 20 is not visible to a passenger looking at the outer layer 30. This effect will occur with any configuration of the seam 20 in which no linear or near-linear trough lies underneath the outer layer 30. The curved bends 26 of this embodiment are especially effective because there is no straight line of any length in the nonlinear portion to which the outer layer 30 can conform itself. Depending on aesthetic and material considerations, the first side portion 24 and the second side portion 25 may be linear. The side portions 24, 25 may also be made nonlinear with a shape similar to that of the nonlinear portion 21.

If desired, the outer layer 30 may also be omitted entirely, and the module 12 may be constructed of a "single-shot" material. Single-shot processing is simply a fabrication process, such as injection molding, that utilizes only a single material, and preferably one single process. The exterior side 16 of the module 12 may be specially formed, through texturing, aesthetic shaping, and the like, to create a cosmetic surface 16.

If no outer layer 30 is used, the seam 20 is preferably formed on the inside of the module 12, i.e., on the interior side of the face portion 15 (not visible in FIG. 1). The seam 20 may otherwise be configured as described above, with a nonlinear portion 21. The nonlinear portion 21 then prevents read through because there is no viewpoint from which a user may see through any substantial part of the seam 20. A user perceives no significant unnatural variation in the cosmetic surface 16. Thus, no styling line need be formed in the exterior side 16.

Additionally, whether the outer layer 30 is used, or the exterior side 16 is rather made into a cosmetic surface 16, pressure applied against the face portion 15 of the cover 10 by a user does not bend the face portion 15 along any single axis. The seam 20 presents a large variety of weakened bending axes, so that the face portion 15 bends inward in several directions when pressure is applied. The seam 20 thus remains imperceptible to a user, and a user has no reason to repeatedly exert any considerable pressure against the face portion 15.

Figure 2:
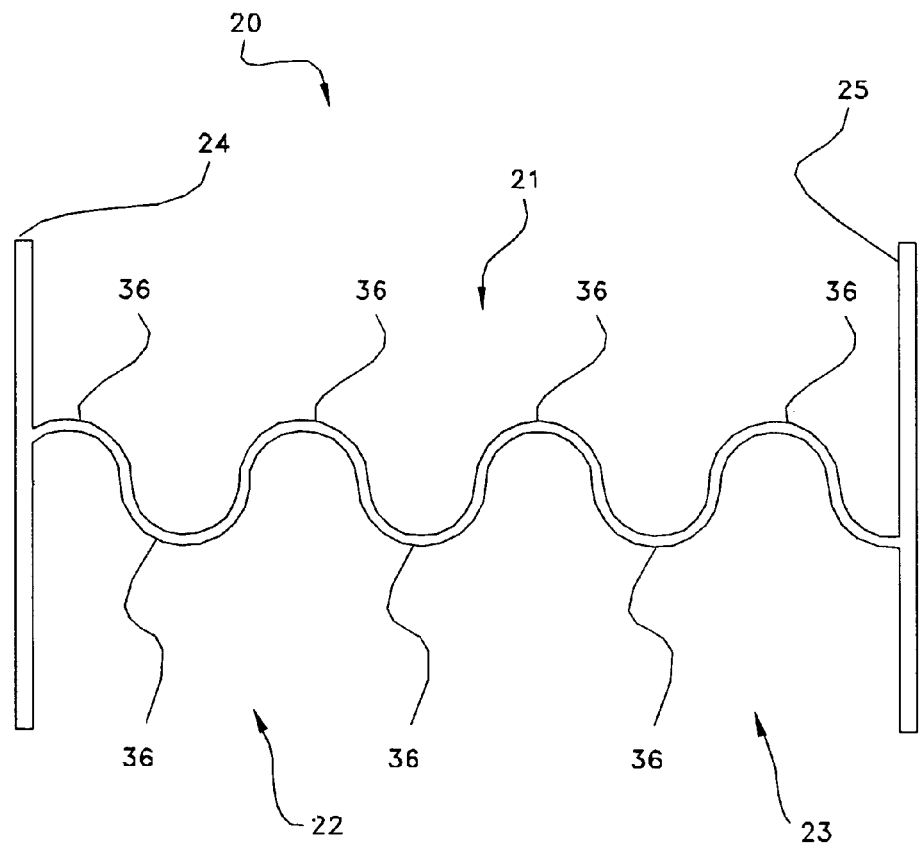
FIG. 2 is a plan view of an alternative embodiment of a seam having a higher number of bends.

Referring to FIG. 2, an alternative embodiment of the seam 20 is presented. In this embodiment, the nonlinear portion 21 has a multiplicity of smaller bends 36 to decrease the width of the nonlinear portion. Smaller bends 36 may provide additional support for especially flexible, thin materials that may be used in the outer layer 30. As with the embodiment of FIG. 1, there are no linear segments in the nonlinear portion 21, and the side portions 24 and 25 may be as shown, or may be made nonlinear as well.

Figure 3:
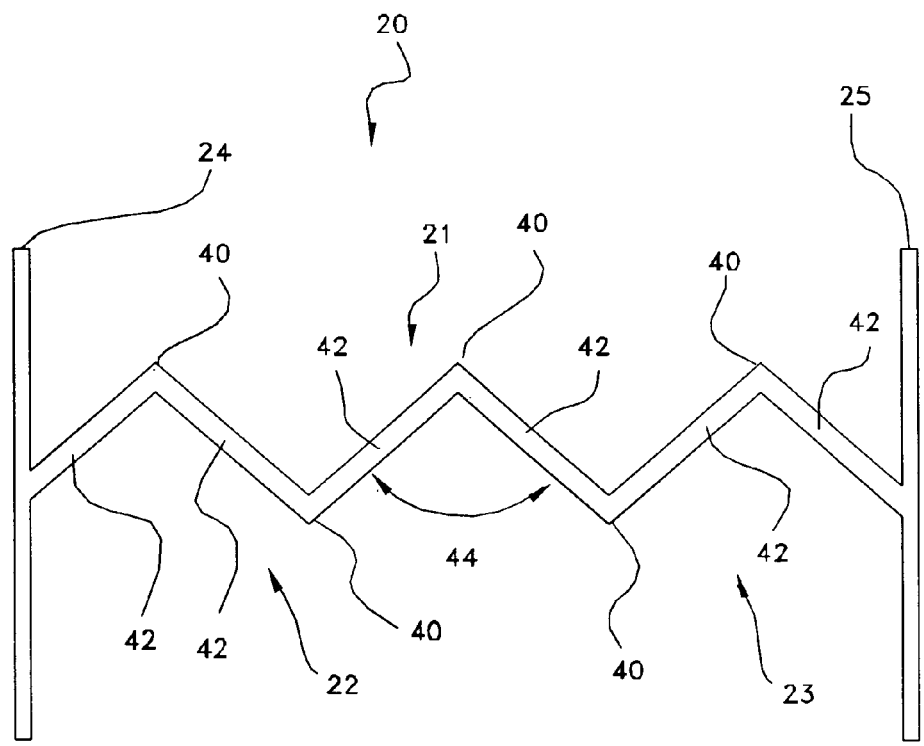
FIG. 3 is a plan view of another alternative embodiment of a seam having pointed bends.

Referring to FIG. 3, another alternative embodiment of the invention is shown. In this configuration, the nonlinear portion 21 is composed of bends 40, in the form of substantially sharp corners 40, connected by linear segments 42. The linear segments 42 are short enough to inhibit folding of the outer layer 30 into the seam 20. Although possibly less effective at masking the seam 20 than the previous embodiments with rounded bends 26, 36, the substantially sharp corners 40 may provide design and manufacturing advantages while still keeping the outer layer 30 out of the seam 20.

Figure 4:
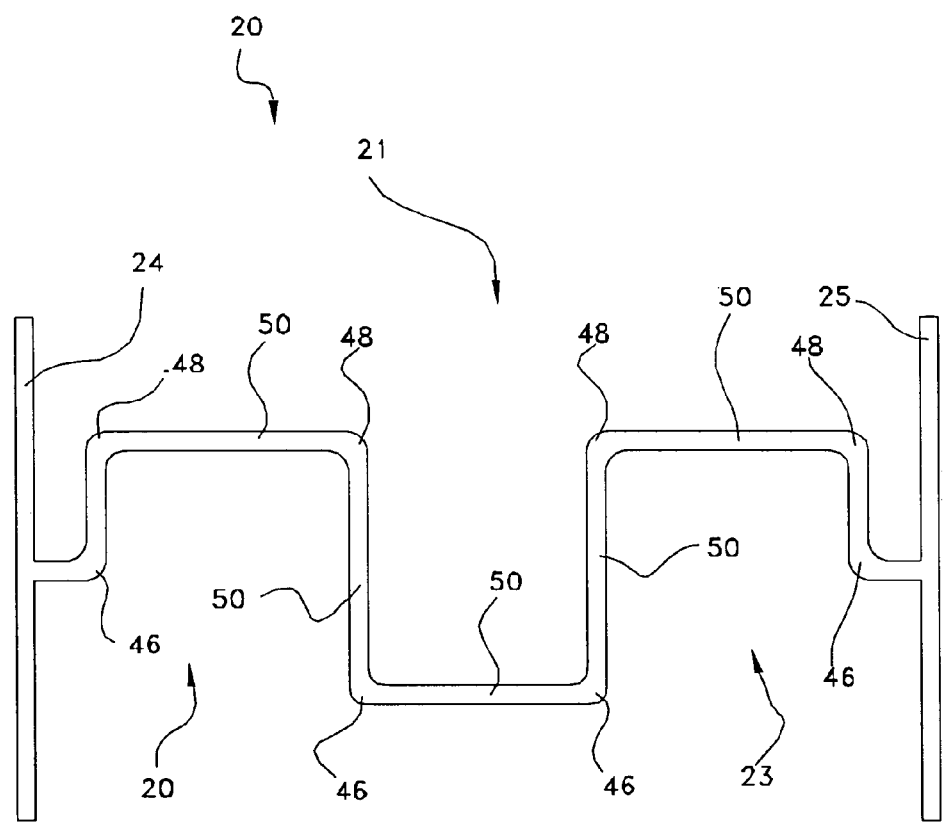
FIG. 4 is a plan view of another alternative embodiment of a seam having a pairs of bends, the pairs oriented in consecutively opposite directions and separated by linear segments.

Referring to FIG. 4, yet another alternative embodiment of the invention is depicted. Traveling from the first end 22 to the second end 23 of the nonlinear portion 21, a counterclockwise bend 46 is followed by two adjacent clockwise bends 48, which are followed by two counterclockwise bends 46, etc. The counterclockwise and clockwise bends 46, 48 are separated by linear segments 50 like those of the previous embodiments. As with the previous embodiment, the linear segments 50 are short enough to prevent unidirectional deformation of the outer layer 30.

Figure 5:
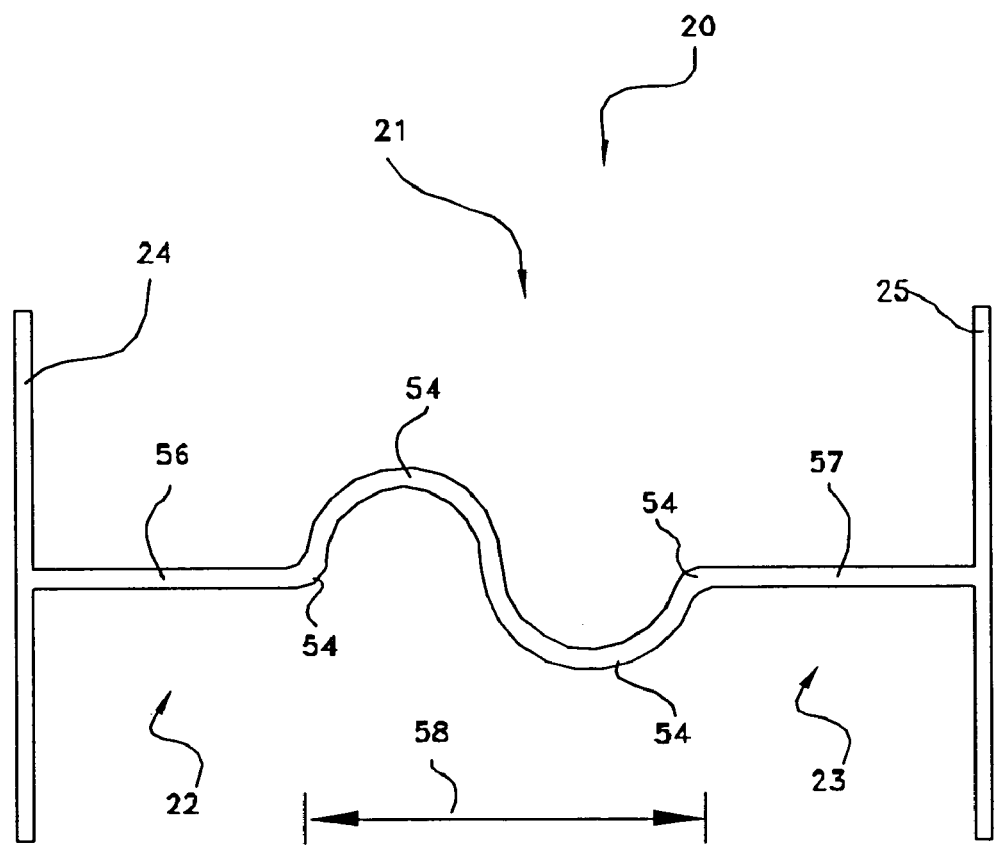
FIG. 5 is a plan view of another alternative embodiment of the seam having linear segments disposed on either side of the bends.

Referring to FIG. 5, another alternative embodiment is shown. As depicted in FIG. 5, the nonlinear portion 21 need not be a homogeneous pattern of linear or nonlinear segments. First and second linear segments 56 and 57, positioned at the first and second ends 22 and 23 of the nonlinear portion 21, respectively, may be connected by a nonlinear segment 58. The nonlinear portion 21 is still nonlinear because the path along the nonlinear portion 21 between the first and second ends 22 and 23 is only partially straight.

Figure 6:
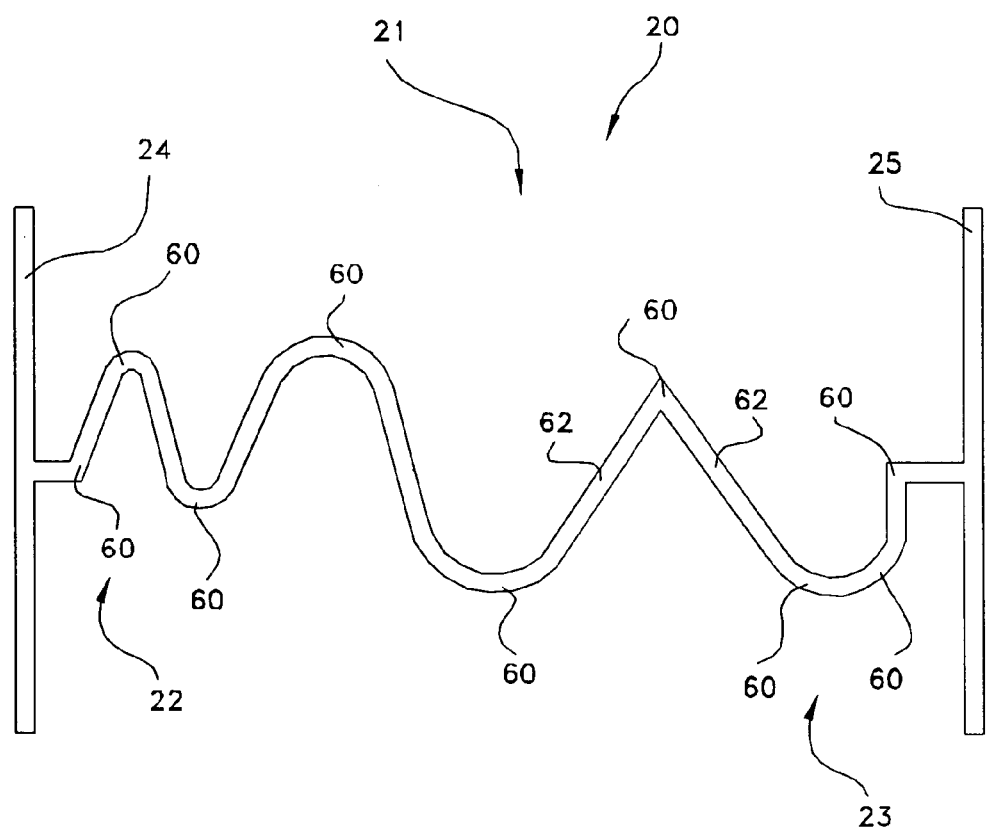
FIG. 6 is a plan view of another alternative embodiment of the seam having a mix of bends of different sizes and shapes intermingled with linear segments.

Referring to FIG. 6, yet another alternative embodiment is depicted. The nonlinear portion 21 of the seam 20 may include a mixture of bends 60 and linear segments 62 of various shapes and sizes. The seam 20 need not be precisely formed, and will not show through the outer layer 30 as long as the requisite nonlinear features are found. The bends 60 may also be distributed asymmetrically along the seam 20.

Figure 7:
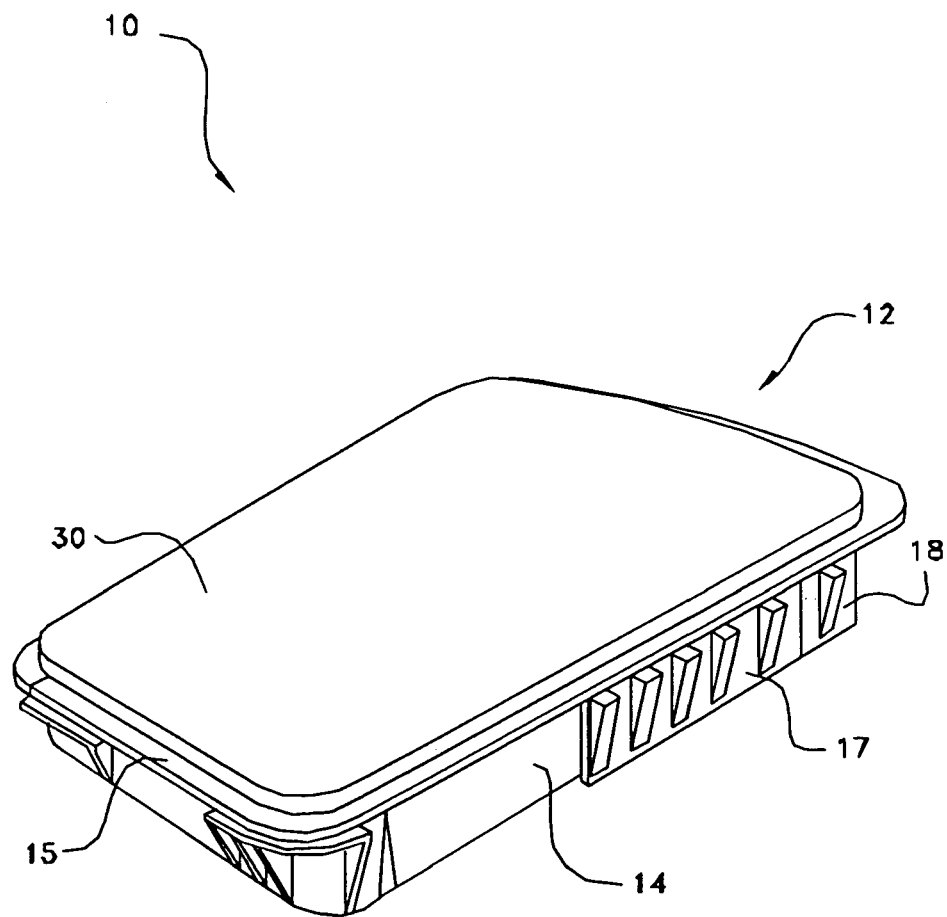
FIG. 7 is a perspective view of the safety restraint device cover of FIG. 1 with an outer layer attached, concealing the seam.

Referring to FIG. 7, the cover 10 of the present invention is shown with the seam 20 hidden. If an outer layer 30 is used, it has been attached to the exterior side 16 of the cover 10, as depicted in FIG. 7. The outer layer 30 may be installed by any known method, including but not limited to adhesive bonding, chemical bonding, heat bonding, vacuum forming, RF welding, mechanical fastening, swaging, and sewing. The outer layer 30 shows little or no sign of the seam 20 because the outer layer 30 is not form-fitted to the seam 20.

However, if no outer layer 30 has been used, the exterior side 16 is simply formed as a cosmetic surface 16. In such a case, the cover 10 appears as shown in FIG. 7, except that no outer layer 30 is present. The seam 20 is substantially invisible, even though there is no styling line on the cosmetic surface 16, because the seam 20 is nonlinear and therefore prevents read through. Similarly, any deformation that occurs in the cosmetic surface due to the seam 20 is also relatively unobservable.

Thus, the cover 10 is ready for installation in a vehicle. The locking tabs 18 may be aligned with suitable receptacles in the vehicle so that the cover 10 is held firmly within the vehicle. The outer layer 30, if present, appears simply as a panel; any designs be formed on the panel before or after installation in the vehicle without the interference of the seam 20.

Accordingly, the principles of material deformation are effectively applied by the present invention. The meandering nature of the seam 20 ensures that there is no single axis along which the outer layer 30 can visibly bend. As a result, the seam 20 is effectively hidden, and will not interfere with design schemes for the vehicle interior. Furthermore, occupants of the vehicle are not drawn to damage the outer layer 30 over the seam or keep their arms and hands in dangerous proximity to the airbag. Thus, the novel seam 20 of the present invention keeps the outer layer 30 flat, thereby making the entire cover 10 for an airbag more attractive, hassle-free, and safe.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A cover for a safety restraint device for use in a vehicle, the cover comprising:
   a face portion capable of being positioned between the safety restraint device and an interior compartment of the vehicle, the face portion comprising an exterior side facing away from the safety restraint device;
   a seam formed in the face portion, the seam comprising a nonlinear portion having a first end and a second end, the nonlinear portion comprising a plurality of bends in consecutively alternating directions; and
   an outer layer affixed to the exterior side of the face portion, wherein the outer layer is formed from a material that is sufficiently stiff to resist form-fitting the seam such that a cavity is interposed between the seam and the outer layer, and the outer layer is devoid of visible indicia of the seam.

2. The cover of claim 1, wherein the bends are adjacent to each other, exclusive of any linear segment therebetween.

3. The cover of claim 1, wherein the seam further comprises a linear segment disposed between and adjacent to two of the bends.

4. The cover of claim 1, wherein the nonlinear portion further comprises a first linear segment positioned proximate the first end of the nonlinear portion.

5. The cover of claim 4, wherein the nonlinear portion further comprises a second linear segment positioned proximate the second end of the nonlinear portion.

6. The cover of claim 5, wherein the nonlinear portion further comprises a nonlinear segment positioned between the first and second linear segments.

7. The cover of claim 1, wherein the nonlinear portion further comprises a plurality of pairs of bends, each pair comprising two bends oriented in the same direction, the pairs oriented in consecutively alternating directions.

8. The cover of claim 1, wherein the bends are substantially sharp corners.

9. The cover of claim 1, wherein the bends are of nonuniform size and shape.

10. The cover of claim 1, wherein the seam further comprises:
    a first side portion substantially perpendicular to the first end of the nonlinear portion; and
    a second side portion substantially perpendicular to the second end of the nonlinear portion.

11. The cover of claim 10, wherein the first side portion is adjacent to the first end of the nonlinear portion, and the second side portion is adjacent to the second end of the nonlinear portion.

12. The cover of claim 11, wherein the first and second side portions are substantially linear.

13. The cover of claim 1, wherein the face portion is formed by single-shot construction, and wherein the face portion operates exclusive of the outer layer.

14. A cover for a safety restraint device for use in a vehicle, the cover comprising:
    a face portion positionable between the safety restraint device and an interior compartment of the vehicle, the face portion comprising an exterior side facing away from the safety restraint device;
    a seam formed in the face portion, the seam comprising a nonlinear portion, the nonlinear portion comprising a plurality of bends in consecutively alternating directions, the bends being adjacent to each other and substantially exclusive of any linear segment therebetween; and
    an outer layer affixed to the exterior side of the face portion, wherein the outer layer is formed from a material that is sufficiently stiff to resist form-fitting the seam such that a cavity is interposed between the seam and the outer layer, and the outer layer is devoid of visible indicia of the seam.

15. The cover of claim 14, wherein the seam further comprises:
    a first end; and
    a second end positioned opposite the first end.

16. The cover of claim 15, wherein the seam further comprises:
    a first side portion adjacent and substantially perpendicular to the first end of the nonlinear portion, the first side portion being substantially linear; and
    a second side portion adjacent and substantially perpendicular to the second end of the nonlinear portion, the second side portion being substantially linear.

17. The cover of claim 16, wherein the face portion is formed by single-shot construction, and wherein the face portion operates exclusive of the outer layer.

18. A cover for a safety restraint device for use in a vehicle, the cover comprising:
    a face portion positionable between the safety restraint device and an interior compartment of the vehicle, the face portion comprising an exterior side facing away from the safety restraint device;
    a seam formed in the face portion, the seam comprising:
        a nonlinear portion having a first end and a second end, the nonlinear portion comprising a plurality of bends in consecutively alternating directions, the bends being adjacent to each other and substantially exclusive of any linear segment therebetween;
        a first side portion adjacent and substantially perpendicular to the first end of the nonlinear portion, the first side portion being substantially linear; and
        a second side portion adjacent and substantially perpendicular to the second end of the nonlinear portion, the second side portion being substantially linear; and
    an outer layer affixed to the exterior side of the face portion, wherein the outer layer is formed from a material that is sufficiently stiff to resist form-fitting the seam such that a cavity is interposed between the seam and the outer layer, and the outer layer is devoid of visible indicia of the seam.

19. The cover of claim 18, wherein the face portion is formed by single-shot construction, and wherein the face portion operates exclusive of the outer layer.

20. A method for making a cover for a safety restraint device for use in a vehicle, the method comprising:
    providing a face portion adapted to be installed between the safety restraint device and an interior compartment of the vehicle, the face portion comprising an exterior side facing away from the safety restraint device;
    forming a seam in the face portion, the seam having a nonlinear portion with a first end and a second end, the nonlinear portion comprising a plurality of bends in consecutively alternating directions; and
    affixing an outer layer to the face portion over the seam, wherein the outer layer is formed from a material that is sufficiently stiff to resist form-fitting the seam such that a cavity is interposed between the seam and the outer layer, and the outer layer is devoid of visible indicia of the seam.

21. The method of claim 20, further comprising forming a first side portion adjacent and substantially perpendicular to the first end of the nonlinear portion, the first side portion being substantially linear.

22. The method of claim 21, further comprising forming a second side portion adjacent and substantially perpendicular to the second end of the nonlinear portion, the second side portion being substantially linear and parallel to the first side portion.

23. The method of claim 22, wherein the seam comprises a recessed portion of the face portion, the recessed portion having a thickness smaller than an average thickness of the face portion.

24. A cover for a safety restraint device for use in a vehicle, the cover comprising:
    a face portion capable of being positioned between the safety restraint device and an interior compartment of the vehicle, the face portion comprising an exterior side facing away from the safety restraint device;
    a seam formed in the face portion, the seam comprising a nonlinear portion having a first end and a second end, the nonlinear portion comprising at least four bends in consecutively alternating directions; and
    an outer layer affixed to the exterior side of the face portion, wherein the outer layer is formed from a material that is sufficiently stiff to resist form-fitting the seam such that a cavity is interposed between the seam and the outer layer, and the outer layer is devoid of visible indicia of the seam.

25. The cover of claim 24, wherein the nonlinear portion further comprises at least two pairs of bends, each pair comprising two bends oriented in the same direction, the pairs oriented in consecutively alternating directions.

26. The cover of claim 24, wherein the face portion is formed by single-shot construction and wherein the face portion operates exclusive of an outer layer.

27. The cover of claim 26, wherein the seam is further formed in an interior side of the face portion, the interior side facing toward the safety restraint device, and wherein the exterior side of the face portion comprises a cosmetic surface.

* * * * *